United States Patent [19]

Beck et al.

[11] Patent Number: 4,931,197

[45] Date of Patent: Jun. 5, 1990

[54] COPOLYMERS FOR α-β-UNSATURATED DICARBOXYLIC ACID ESTERS WHEREIN SAID ESTERS ARE COMPRISED OF ETHOXYLATED ESTERS, METHODS FOR THEIR PRODUCTION AS WELL AS THEIR USE AS LUBRICANT FOR THE WORKING-UP OF PLASTICS

[75] Inventors: Heinz Beck, Düren; Karl-Heinz Frassek, Langerwehe, both of Fed. Rep. of Germany; Eduard M. Verhulst, Zevenaar; Egenius A. Giezen, Rheden, both of Netherlands

[73] Assignee: AKZO NV, Arnhem, Netherlands

[21] Appl. No.: 168,554

[22] Filed: Mar. 4, 1988

Related U.S. Application Data

[63] Continuation of Ser. No. 418,401, Sep. 15, 1982, abandoned.

[30] Foreign Application Priority Data

Sep. 17, 1981 [DE] Fed. Rep. of Germany ....... 3136931

[51] Int. Cl.$^5$ .................... C10M 101/04; C08F 18/16
[52] U.S. Cl. ................................ 252/56 R; 252/56 S; 526/320; 526/323; 526/324
[58] Field of Search ........................ 526/320, 323, 324; 252/56 R, 56 P

[56] References Cited

U.S. PATENT DOCUMENTS

| | | | |
|---|---|---|---|
| 2,442,558 | 6/1948 | D'Alelio | 526/321 |
| 2,542,550 | 2/1951 | McDermott | 252/56 P |
| 2,543,964 | 3/1951 | Giommaria | 252/56 |
| 3,010,906 | 11/1961 | Signouret et al. | 252/56 |
| 3,197,409 | 7/1965 | de Vries | 252/56 D |

FOREIGN PATENT DOCUMENTS 663702 12/1937 United Kingdom ................ 526/320

*Primary Examiner*—Joseph L. Schofer
*Assistant Examiner*—Peter F. Kulkosky
*Attorney, Agent, or Firm*—Michael J. Striker

[57] ABSTRACT

The copolymers of the invention are made from α,β-unsaturated dicarboxylic acid esters and α-olefins. The α-olefins employed have 8 to 24 C-atoms and the α,β-unsaturated dicarboxylic acid esters are made solely from ethoxylated alcohol with a degree of ethoxylation of 1 to 45. Also disclosed is a process for the production of these copolymers, in which either α-olefin having 8–24 C-atoms is copolymerized with α-β-unsaturated dicarboxylic anhydride or α-β-unsaturated dicarboxylic acid at temperatures of 80°–210° C. in the presence of a peroxide catalyst in an inert gas atmosphere, along with esterification with ethoxylated alcohol having a degree of ethoxylation of 1–45 in the mole ratio of 1:1 to 1:2 α-β-unsaturated dicarboxylic acid or anhydride : ethoxylated alcohol, or by copolymerizing α-olefins having 8–24 C-atoms and α-β-unsaturated dicarboxylic acid ester having ethoxylated alcohol with a degree of ethoxylation from 1 to 20 as alcohol component at temperatures of 140°–210° C. in the presence of a peroxide catalyst in an inert gas atmosphere. The copolymers are preferably used as lubricant for the shaping treatment of thermoplastic plastics.

20 Claims, No Drawings

COPOLYMERS FOR α-β-UNSATURATED DICARBOXYLIC ACID ESTERS WHEREIN SAID ESTERS ARE COMPRISED OF ETHOXYLATED ESTERS, METHODS FOR THEIR PRODUCTION AS WELL AS THEIR USE AS LUBRICANT FOR THE WORKING-UP OF PLASTICS

This application is a continuation of application Ser. No. 418,401, filed Sept. 15, 1982, now abandoned.

BACKGROUND OF THE INVENTION

The invention concerns copolymers from α-β-unsaturated dicarboxylic acid esters with α-olefins, their production and their use as lubricants for the shaping treatment of plastics.

Olefin-maleic acid-copolymer derivatives are known from German Offenlegungsschrift DE-OS No. 27 27 239, which are constructed from olefins with an average of 2–24 carbon atoms and maleic acid and are esterified with univalent alcohols having a chain length from 2–20 carbon atoms in the mole ratio 1:0.5 up to 1:2 maleic acid to alcohol. The described olefin-maleic acid-copolymer derivatives are produced through copolymerization of maleic acid anhydride with α-olefins and connected esterification into semi- or diester. The there described olefin-maleic acid-copolymer derivatives are particularly suitable as lubricants for the shaping working-up of plastics.

Beyond that, high-molecular copolymers from α-olefins and α-β-unsaturated dicarboxylic acid esters have been known for example as hair sprays (AU-PS No. 254,327) and as coating agents for medicines (AU-PS No. 263,011). These were produced by copolymerization of α-olefins and α-β-unsaturated dicarboxylic acids or acid anhydrides and subsequent esterification of the copolymers.

German Offenlegungsschrift DE-OS No. 17 70 860 discloses a copolymerisate of a $C_{22}$–$C_{28}$-1-olefin and dibehenylmaleate, which was obtained by polymerization at 150° C. It was suggested to add the product to hydrocarbons, in order to lower the solidification point or totally improve the flowability.

AU-PS No. 479,746 describes copolymerisate from α-β-unsaturated dicarboxylic acid esters having one or two straight-chain ester groups with 18–44 C-atoms with $C_{18}$–$C_{46}$-α-olefins as flowability improver for wax-like hydrocarbon oil, the copolymerisate effecting a lowering of the pour point of the hydrocarbon oil.

Numerous substances have already been suggested as lubricants for the shaping working-up of plastics. With regard to their characteristics, they display more or less great differences, or possess in many respects advantages in contrast to others. One significant characteristic is the compatibility of lubricants with determined stabilizers, which are likewise mixed in for the deformation of plastics in order to avoid degradation phenomena resulting from the stress and strain occurring upon deformation. As stabilizers, for example metal salts or metalloorganic compounds are used. One known type of stabilizer, which is used for the stabilization of PVC (polyvinyl chloride), is composed from tin compounds. Many, even of these tin, stabilizers are not well compatible with lubricants. Those stabilizers for which this applies in particular measure include, for example, dibutyl tin-di-monomethylmaleate. In order to be able to produce mixtures with lubricants, both stable and of good dosability, also with these stabilizers, which are very approved in practice, efforts have for a long time been made—without great success—to test lubricants which would make such mixtures possible.

SUMMARY OF THE INVENTION

It has now been determined that copolymerisates of α-β-unsaturated dicarboxylic acid esters and α-olefins, which are thereby characterized in that they are constructed from α-olefins having 8–24 C-atoms and from α-β-unsaturated dicarboxylic acid esters, the alcohol components of which are ethoxylated alcohols with a degree of ethoxylation from 1–45, preferably 1–20, are outstandingly suitable lubricants for such mixtures.

In preferred manner, the copolymers are so constructed that α-β-unsaturated dicarboxylic acid esters are α-β-unsaturated dicarboxylic acid diesters. The esters of maleic acid, fumaric acid, citraconic acid, mesaconic acid, or itaconic acid come into consideration as examples of α-β-unsaturated dicarboxylic acid esters. Preferably, however, the esters of maleic acid and fumaric acid are used.

Copolymers in which the α-olefin is unbranched are preferred. The copolymers which are constructed from 10–16 C-atoms display particularly good compatibility with the stabilizers. In preferred manner, the mole ratio α-olefin to α-β-unsaturated dicarboxylic acid esters amounts to 0.5–4.

The polymers according to the present invention are accessible in two manners, one being namely through copolymerization of α-β-unsaturated dicarboxylic acids or their anhydrides followed by esterification with ethoxylated alcohols having a degree of ethoxylation of 1–45. By degree of ethoxylation should be understood the number of ethenoxide units of a (poly)-ethylene oxide chain, which is etherified on one end with an alcohol, while the hydroxyl group at the other end of the (poly)ethylene oxide chain is esterified with the acid group.

Using this manner of production one obtains with the polymers a ratio of α-olefins to α-β-unsaturated dicarboxylic acid esters in the copolymers of about 1:1.

Such a method is thereby characterized according to the present invention in that α-olefins having 8–24 C-atoms and β-unsaturated dicarboxylic acids are copolymerized at temperatures of 80°–210° C. in the presence of a peroxide catalyst in an inert gas atmosphere, and in connection therewith are esterified with ethoxylated alcohol having a degree of ethoxylation of 1–45 in the mole ratio from 1:1 up to 1:2 α-β-unsaturated dicarboxylic acid (or anhydride):ethoxylated alcohol.

The other manner of producing the polymers according to the present invention proceeds from already esterified α-β-unsaturated dicarboxylic acid esters, which are copolymerized with α-olefins.

This process is thereby characterized in that α-olefins having 8–24 C-atoms and α-β-unsaturated dicarboxylic acid ester, the alcohol component of which is ethoxylated alcohol having a degree of ethoxylation of 1–20, are copolymerized at temperatures of 140°–210° C., preferably 160°–200° C., in the presence of a peroxide catalyst and in an inert gas atmosphere.

In this manner copolymers are also accessible in which the ratio of α-olefin to α-β-unsaturated dicarboxylic acid ester in the copolymers lies between 0.5 and 4. Such products are extensively liquid at room temperature.

Although the amounts of peroxide catalyst otherwise lies within the scope of customary additives, it is preferred within the scope of the present invention to limit the amount of peroxide to the range from 0.005 to 0.05 mole/mole monomer. Preferably, the peroxide catalyst is added portionwise in time intervals. According to one particular embodiment of the present invention, the addition of the peroxide catalyst follows in such manner that, initially, it is started through the addition of ⅓ of the amount of peroxide catalyst, and the remaining amount of peroxide catalyst is added in 8–12 portions.

In order to arrive at mole ratios of α-olefin to α-β-unsaturated dicarboxylic acid ester from 0.5 to 4 in the polymers, the monomers are used in the mole ratio 0.5–7.

On the basis of their viscosity behavior and their ability to emulsify, the copolymers according to the present invention are useful as additive for the lowering of the pour point with both mineral oils and lubricants.

As most important area of use for the copolymers according to the present invention, mention should be made mainly of lubricants for the shaping treatment of thermoplastic plastics. This comes to light still more strongly in the following examples, whereby in particular is highlighted the good compatibility with such tin stabilizers which contain ligands at the tin having bonding considered to be more ionic than covalent. The copolymers according to the present invention are emulsifiable and provide stable emulsions. They are therefore useful in mixture with waxes and with the copolymers according to German Offenlegungsschrift DE-OS No. 27 27 239 in polishing wax preparations such as, for example, shoecare agents, floor care agents, and lubricants for the working-up of metal, among others. They can also serve in aqueous emulsions as cooling agent for the cutting, machining and similar deformations of metal parts.

The novel features which are considered characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

EXAMLE 1

This Example describes the production of copolymers in which the relative amounts of α-olefin to α-β-unsaturated dicarboxylic acid ester amounts to 1:1, and the half esters are formed.

One mole of an $C_{14/16}$-α-olefin mixture (average molecular weight 205) is heated in a reaction vessel, after rinsing with nitrogen, to the reaction temperature of 150° C. Then 10 portions, each of 0.1 mole maleic acid anhydride with 0.005 mole di-t-butylperoxide, are added at 30 minute intervals. About 30 minutes after the last addition, one mole of the ethoxylated alcohol is added, after which a temperature of 150° C. is maintained a further 2 hours. In the mentioned manner, the copolymers tabulated in the following summary are produced.

| Designation | α-Olefin | Ethoxylated Alcohol |
| --- | --- | --- |
| 1A | C14/16 | ethylglycol |
| 1B | C14/16 | methylglycol |
| 1C | C14/16 | methyldiglycol |
| 1D | C14/16 | methoxypolyethyleneglycol, |

-continued

| Designation | α-Olefin | Ethoxylated Alcohol |
| --- | --- | --- |
| 1E | C15/16 | ethoxylation degree = 7 methoxypolyethyleneglycol, ethoxylation degree = 12 |

EXAMPLE 2

In this Example the production of copolymers is described, for which the ratio of α-olefin to α-β-unsaturated dicarboxylic acid ester can deviate from the ratio 1:1 and for which α-β-unsaturated dicarboxylic acid diesters are copolymerized with the α-olefins.

5 mole maleic acid anhydride (or an equivalent amount of fumaric acid), 14 mole of an ethoxylated alcohol, 25 g p-toluenesdulfonic acid and 500 ml toluene are mixed together and heated to boiling temperature. The reaction water and, with connection of a vacuum, the toluene and the excess alcohol, are distilled off. The mixture is then heated to 160° C. and the α-olefin is added. The reaction vessel is rinsed with nitrogen and in 11 portions at intervals of 30 minutes each, 0.03 mole di-t-butylperoxide is added. 30 minutes after the last peroxide addition the excess α-olefin is distilled off in a vacuum. A coloration—particularly with low ratios α-olefin to α-β-unsaturated dicarboxylic acid ester—can be avoided through addition of sodium hypophosphite after the esterification.

According to the previously described process, the copolymers tabulated in the following summary were produced:

| Designation | α-Olefin | Ethoxylated Alcohol | Monomer Ratio | Polymerisation Temperature |
| --- | --- | --- | --- | --- |
| 2A | C10 | ethylglycol | 3:1 | 170 |
| 2B | C10 | ethylglycol | 2.59:1 | 170 |
| 2C | C10 | ethylglycol | 1:1 | 170 |
| 2D | C10 | methylglycol | 1:1 | 170 |
| 2E | C10 | methyldiglycol | 3:1 | 170 |
| 2F | C10 | methyldiglycol | 1:1 | 170 |
| 2G | C12 | ethylglycol | 1:1 | 200 |
| 2H | C12 | methylglycol | 1:1 | 200 |
| 2I | C12 | methyldiglycol | 1:1 | 200 |
| 2K | C12 | methyldiglycol | 3:1 | 200 |
| 2L | C14/16 | methylglycol | 0.82:1 | 200 |
| 2M | C14/16 | methylglycol | 1:1 | 200 |
| 2N | C14/16 | methylglycol | 0.68:1 | 200 |
| 2O | C14/16 | ethylglycol | 1:1 | 200 |
| 2P | C14/16 | ethylglycol | 0.68:1 | 200 |
| 2Q | C14/16 | ethylglycol | 0.5:1 | 160 |
| 2R | C14/16 | methyldiglycol | 1:1 | 200 |

EXAMPLE 3

The copolymers produced according to Examples 1 and 2 were tested for their compatibility with sulfur-free tin stabilizers. Dibutyltin dimonomethylmaleate served therewith as sample substance.

After mixing the copolymers with the stabilizer in different weight ratios at 90° C., the samples are cooled to room temperature and then left 1 week at room temperature.

It is then observed whether a phase separation follows or whether a precipitation has occurred.

It was determined that with all of the copolymers according to Examples 1 and 2 at weight ratio 1:1 copolymer to tin stabilizer, neither a phase separation nor a precipitation had occurred. At weight ratio 1:3 copolymer to tin stabilizer, the same result is obtained for the copolymers 1E; 2C; 2D; 2E; 2H; 2I; 2L; 2N; and 2R; whereas with the other copolymers at with weight ratio a turbidity is visible.

EXAMPLE 4

The behavior of plastic masses upon deformation from the melt can be determined by measurements in the "Brabender Plasticorder". In this Example there are described measurements which were performed on plastic masses formed from 100 parts by weight PVC suspension, 2 parts by weight dibutyltin dimonomethylmaleate, and portions of 0.5 parts by weight of one of the copolymers according to Examples 1 and 2. For purposes of comparison, a commerically available lubricant is tested in the same manner. The results are summarized in Table 1, wherein the designation I is used for the commercially available lubricant. It involves therewith an ethylene glycol ester of montanic acid.

Lubricants intrinsically lower the melt viscosity. This is manifested with measurements in the "Brabender Plasticorder" in that a small force is necessary. In addition, lubricants increase the gelation time and decrease the adhesion of the plastic to the wall.

In the "Brabender Plasticorder" the following conditions are maintained:

| Temperature | 160° C. |
|---|---|
| Velocity | 15 revolutions/minute |
| Sample Weight | 31 g |

The following Tables 1 and 2 show the results with regard to gelation time, moment of rotation upon gelation, gelation temperature, torque 10 minutes after the gelation, and temperature 10 minutes after the gelation.

In addition, the transparency of test disks of 3 mm thickness is measured at a wavelength of 690 nm.

TABLE 1

| Copolymer | Gelation Time (min.) | Torque upon Gelation | Temperature upon Gelation (°C.) | Torque 10 min. after Gelation | Temperature 10 min. after Gelation | Transparency (%) |
|---|---|---|---|---|---|---|
| 1A | 5.7 | 2500 | 156 | 2700 | 160 | 76 |
| 1B | 5.4 | 2650 | 155 | 2700 | 160 | 78 |
| 1C | 6.7 | 2550 | 155 | 2800 | 160 | 78 |
| 1D | 7.2 | 2400 | 156 | 2700 | 160 | 81 |
| 1E | 8.8 | 2400 | 156 | 2700 | 160 | 82 |

TABLE 2

| Copolymer | Gelation Time (min.) | Torque upon Gelation (m · g) | Temperature upon Gelation (°C.) | Torque 10 min. after Gelation | Temperature 10 min. after Gelation | Transparency (%) |
|---|---|---|---|---|---|---|
| I | 6.9 | 2600 | 155 | 2750 | 160 | 74 |
| 2A | 11 | 2500 | 155 | 2750 | 160 | 74 |
| 2C | 5.5 | 2600 | 155 | 2775 | 159 | 84 |
| 2D | 5.1 | 2500 | 155 | 2750 | 160 | 81 |
| 2E | 7.1 | 2500 | 154 | 2750 | 160 | 80 |
| 2F | 4.4 | 2550 | 153 | 2750 | 159 | 84 |
| 2G | 6.9 | 2600 | 154 | 2700 | 160 | 81 |
| 2H | 5.2 | 2600 | 154 | 2775 | 159 | 83 |
| 2I | 5.3 | 2600 | 154 | 2800 | 160 | 84 |
| 2K | 6.4 | 2600 | 155 | 2700 | 160 | 81 |
| 2L | 4.9 | 2600 | 154 | 2750 | 160 | 84 |
| 2M | 5.1 | 2500 | 154 | 2750 | 160 | 88 |
| 2N | 5.1 | 2600 | 155 | 2750 | 160 | 88 |
| 2O | 7.4 | 2500 | 155 | 2700 | 160 | 79 |
| 2P | 6.3 | 2500 | 155 | 2700 | 160 | 82 |
| 2R | 6.0 | 2600 | 155 | 2700 | 160 | 87 |

EXAMPLE 5

The suitability of the copolymers as lubricant is also shown with the mill test. For this purpose, mixtures are produced from 100 parts by weight of a suspension of PVC, 1.5 parts by weight dibutyltin dimethylmonomaleate, 0.5 or 1 part by weight of the copolymer or a commercial lubricant, as well as 1 part by weight of a fatty alcohol or glycerine monofatty acid ester and 1 part by weight polymethacrylate as flowing agent. For the mill test the following conditions are adjusted:

| Temperature of the front roll | 180° C. |
|---|---|
| Temperature of the rear roll | 176° C. |
| Clearance width | 0.9 mm |
| Ratio of friction | 1:1 |
| Rotational speed | 15 rpm |

Every 5 minutes the samples are withdrawn, and the test is terminated when the sample has stuck to the roller or when a brown coloration is observed. The results are set forth in the following Table 3.

TABLE 3

| Copolymer | Parts by Weight | Time until sticking (minutes) | Melting temperature at end of the test |
|---|---|---|---|
| I | 0.5 | 15 | 187 |
| I | 1.0 | 30 (brown, no sticking) | 186 |
| 2A | 0.5 | 25 | 188 |
| 2A | 1.0 | 35 (brown, no sticking) | 186 |
| 2C | 0.5 | 35 (brown, no sticking) | 188 |
| 2C | 1.0 | 35 (brown, no sticking) | 188 |
| 2D | 0.5 | 20 | 187 |
| 2E | 0.5 | 18 | 186 |
| 2F | 0.5 | 15 | 186 |
| 2F | 1.0 | 25 | 187 |
| 2G | 0.5 | 20 | 186 |
| 2L | 1.0 | 10 | 186 |

TABLE 3-continued

| Copolymer | Parts by Weight | Time until sticking (minutes) | Melting temperature at end of the test |
|---|---|---|---|
| 2O | 0.5 | 15 | 186 |
| 2O | 1.0 | 30 (brown, no sticking) | 187 |
| 2P | 0.5 | 20 | 187 |
| 2P | 1.0 | 30 (brown, no sticking) | 187 |
| 2R | 0.5 | 10 | 186 |
| 2R | 1.0 | 10 | 186 |
| 1A | 0.5 | 25 | 186 |
| 1B | 0.5 | 25 | 186 |
| 1C | 0.5 | 20 | 186 |
| 1D | 0.5 | 30 (brown, no sticking) | 186 |
| 1E | 0.5 | 25 | 186 |

It will be understood that each of the elements described above, or two or more together, may also find a useful application in other types of polymers differing from the types described above.

While the invention has been illustrated and described as embodied in copolymers from α, β-unsaturated dicarboxylic acid esters, processes for their production as well as their use as lubricant for the working-up of plastics, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features, that, from the standpoint of prior art, fairly constitute essential characteristics of the generic or specific aspects of this invention.

What is claimed as new and desired to be protected by Letters Patent is set forth in the appended claims.

We claim:

1. Copolymers of:
   a. α-olefin hydrocarbons having 8 to 24 carbon atoms, and
   b. α, β-unsaturated dicarboxylic acid esters having an alcohol component, said alcohol component thereof consisting of ethoxylated alcohols having a degree of ethoxylation from 1 to 45 and wherein ethoxylated alcohol esters are the sole ester group present, wherein the mole ratio of α-olefin hydrocarbon to α, β-unsaturated dicarboxylic acid ester in said copolymers is from 0.5 to 4.

2. Copolymers according to claim 1, wherein the α, β-unsaturated dicarboxylic acid esters are β-α-unsaturated dicarboxylic acid diesters.

3. Copolymers according to claim 1, wherein the α-β-unsaturated dicarboxylic acid ester is maleic acid ester and fumaric acid ester.

4. Copolymers according to claim 1, wherein the α-β-unsaturated dicarboxylic acid ester is maleic acid ester or fumaric acid ester.

5. Copolymers according to claim 1, wherein the α-olefins are unbranched.

6. Copolymers according to claim 1, wherein the α-olefins are constructed with 10–16 carbon atoms.

7. Copolymers according to claim 1, wherein the degree of ethoxylation is from 1 to 20.

8. Method for the production of copolymers from α-β-unsaturated dicarboxylic acid esters and α-olefin hydrocarbons according to claim 1, comprising copolymerizing α-olefin hydrocarbons having 8–24 C-atoms and α-β-unsaturated dicarboxylic acid anhydride or α-β-unsaturated dicarboxylic acid at temperatures of 80°–210° C. in the presence of a peroxide catalyst in an inert gas atmosphere, and esterifying with ethoxylated alcohol having a degree of ethoxylation of 1–45 in a mole ratio from 1:1 up to 1:2 α-β-unsaturated dicarboxylic acid or anhydride: ethoxylated alcohol.

9. Method for the production of copolymers from α-β-unsaturated dicarboxylic acid ester and α-olefin hydrocarbons according to claim 1, comprising copolymerizing α-olefin hydrocarbons having 8–24 C-atoms and α-β-unsaturated dicarboxylic acid esters having ethoxylated alcohol with a degree of ethoxylation of 1–20 as alcohol component at temperatures of 140°–210° C, in the presence of a peroxide catalyst in an inert gas atmosphere.

10. Method according to claim 9, using as α-β-unsaturated dicarboxylic acid ester α-β-unsaturated dicarboxylic acid diester as monomer.

11. Method according to claim 9, using maleic acid ester and fumaric acid ester as α-β-unsaturated dicarboxylic acid ester.

12. Method according to claim 9, using maleic acid ester or fumaric acid ester as α-β-unsaturated dicarboxylic acid ester.

13. Method according to claim 8 or claim 9, using unbranched α-olefin hydrocarbon.

14. Method according to claim 8 or claim 9, wherein 0.005 mole/mole monomer up to 0.05 mole/mole monomer of peroxide catalyst is added.

15. Method according to claim 8 or claim 9, wherein the peroxide catlayst is added portionwise at time intervals.

16. Method according to claim 15, wherein the copolymerization is started through the addition of one third of the amount of peroxide catlyst and the remainder or peroxide catalyst being added in 8–12 portions.

17. Method according to claim 8 or claim 9, using α-olefin hydrocarbon having 10–16 C-atoms.

18. Method according to claim 9, wherein the reaction temperature is 160°–200° C.

19. Method according to claim 9, using α-olefin and α-β-unsaturated dicarboxylic acid ester in a mole ratio of 0.5–7.

20. In a method of shaping treatment of thermoplastic plastics of a type employing a lubricant, the improvement wherein copolymers from α-β-unsaturated dicarboxylic acid esters and α-olefin hydrocarbons according to claim 1 are employed as said lubricant.

* * * * *